United States Patent [19]

Seiver

[11] Patent Number: 4,541,920

[45] Date of Patent: Sep. 17, 1985

[54] COMPOSITION AND REFORMING PROCESS FOR THE OPERATION OF A MAGNETICALLY STABILIZED FLUIDIZED BED

[75] Inventor: Robert L. Seiver, Baton Rouge, La.

[73] Assignee: Exxon Research and Engineering Co., Florham Park, N.J.

[21] Appl. No.: 485,638

[22] Filed: Apr. 18, 1983

Related U.S. Application Data

[63] Continuation of Ser. No. 421,046, Sep. 22, 1982, Pat. No. 4,394,282, which is a continuation-in-part of Ser. No. 218,088, Dec. 19, 1980, Pat. No. 4,368,132, which is a continuation-in-part of Ser. No. 943,552, Sep. 18, 1978, abandoned.

[51] Int. Cl.$^4$ .................... C10G 35/085; C10G 45/62
[52] U.S. Cl. .................... 208/138; 208/111; 208/112; 208/113; 208/143; 208/217; 208/251 H; 208/254 H
[58] Field of Search .................... 252/62.55; 34/1, 10; 208/112, 120, 121, 135, 136, 137, 138, 216 R, 251 R, 111, 113, 143, 217, 251 H, 254 H

[56] References Cited

U.S. PATENT DOCUMENTS

| | | | |
|---|---|---|---|
| 2,879,154 | 4/1959 | Campbell | 252/62.55 |
| 2,967,794 | 1/1961 | Coxe | 75/251 |
| 3,042,543 | 7/1962 | Schuele | 252/62.55 |
| 3,047,505 | 7/1962 | Miller | 252/62.53 |
| 3,440,731 | 4/1969 | Tuthill | 422/139 |
| 3,708,177 | 1/1973 | Baerman | 148/103 |
| 3,767,505 | 10/1973 | Coran et al. | 428/280 |
| 3,849,213 | 11/1974 | Baerman | 148/108 |
| 3,954,678 | 5/1976 | Marquisee | 252/62.56 |
| 3,977,918 | 8/1976 | Paladino et al. | 148/108 |
| 3,979,334 | 9/1976 | Lee et al. | 502/8 |

FOREIGN PATENT DOCUMENTS 666643 7/1963 Canada .................... 252/62.55

*Primary Examiner*—D. E. Gantz
*Assistant Examiner*—O. Chaudhuri
*Attorney, Agent, or Firm*—Llewellyn A. Proctor

[57] ABSTRACT

A catalytic reforming process for the operation of a magnetically stabilized fluidized bed. The process utilizes catalyst compositions characterized as a particulate material which can be oriented within, and formed into a magnetically stabilized fluidized bed which comprises: (i) particles of average size ranging from about 10 micrometers ($\mu$m) to about 4000 $\mu$m, each containing a nonferromagnetic component and a catalytically active component composited with a single elongate ferromagnetic component or plurality of parallely aligned elongate ferromagnetic components. The ferromagnetic component, or components, are multidomain, having dimensions of at least 1 $\mu$m in all directions and a length:diameter (L/D) ratio of at least 2 but not more than 17.3, and the ferromagnetic component, or components, is present in the composite particles as inclusions within a nonferromagnetic matrix constituting at least 0.5%, preferably at least 5%, but not more than $3/2(L/D)^2$ of the total volume of each particle, where the L/D is the ratio of the longest dimension of a ferromagnetic inclusion relative to the shortest dimension. The particles can, in said magnetically stabilized fluidized bed, rotate or turn to line up the long dimensions of the ferromagnetic components parallel to the direction of the field and the short dimensions perpendicular to the direction of the field.

8 Claims, No Drawings

COMPOSITION AND REFORMING PROCESS FOR THE OPERATION OF A MAGNETICALLY STABILIZED FLUIDIZED BED

BACKGROUND OF THE INVENTION AND PRIOR ART

This is a continuation of application Ser. No. 421,046 filed Sept. 22, 1982, U.S. Pat. No. 4,394,282, which is a continuation-in-part of application Ser. No. 218,088 filed Dec. 19, 1980, U.S. Pat. No. 4,368,132, which in turn is a continuation-in-part of application Ser. No. 943,552 filed Sept. 18, 1978, now abandoned.

Recently it has been discovered that a fluidized bed of magnetizable particulate solids can be stabilized when operated under the influence of a magnetic field, and that such a bed is useful for conducting various fluid-solids contacting processes; inclusive particularly of adsorption, absorption, particulate removal and catalytic processes. Notable among these are gas-solids contacting processes primarily designed for particulate capture but which may also feature a catalytic reaction, or reactions; or the process may be primarily designed for conducting a chemical reaction, or reactions, with or without the feature of particulate capture. Processes of this type are conducted with composites wherein a ferromagnetic component is incorporated with the non-ferromagnetic component, or components, to render the composite ferromagnetic.

Like conventional fluidized processes a fluid, notably a gas, is injected upwardly at velocity sufficient to overcome the free fall velocities of the individual particles (due to gravity) and cause bed expansion and fluidization of the particles without sweeping significant amounts of the particles, catalytic or otherwise, from the bed. In conventional fluidized processes, however, the injection of gas at velocity sufficient to produce expansion of the bed (i.e., transform the fixed bed from a fixed packed bed to a fluidized bed) is accompanied by significant bubble formation whereas, in contrast, in a fluidized bed subjected to the influence of a magnetic field at conditions which does not increase the weight of the bed there exists an interim, or quiescent zone wherein there is little, if any, motion exhibited by the particles within the fluidized bed. Thus, within this zone the formatin of bubbles and slugs are virtually eliminated due to the interaction between the fluidized ferromagnetic particles and the magnetic field; operation within such zone characterizing that of a magnetically stabilized bed.

Magnetically stabilized bed processes offer advantages over both fixed and fluidized bed operations. They provide superior operation over conventional fluidized bed operations in that they provide better counter-current contacting, low gas and solids back mixing, and lower particle attrition. They provide better operation as contrasted with fixed bed operations in that they provide lower pressure drop, better ability to transfer solids, and virtually eliminate bed plugging problems. A process disclosing a magnetically stabilized bed and its mode of operation for conducting catalytic reactions, and the capture of particulates to provide a filtering action is disclosed in U.S. Pat. No. 4,115,927 by Ronald E. Rosensweig.

Catalyst composites comprised of ferromagnetic inclusions dispersed within matrices constituted in part of nonferromagnetic materials and the subjection of beds of such particles to the influence of a magnetic field are known; albeit much of the early work dating back over the last decade was done with particulate ferromagnetic materials which were not catalytically active, or possessed of only limited catalytic activity. Thus, e.g., iron powder or steel balls, were of questionable merit as catalysts; or if catalytic to a limited extent, then the ferromagnetic component constituted essentially the whole of the catalyst. In any regard, a reference by Ivanov et al, *Zhurnal Prikladoni Khimii*, 43 2200–2204 (1970) describes catalytic particles characterized as $Fe_2O_3$ (88.16%), apparently the gamma phase of $Fe_2O_3$ which is magnetic, which were collected together to form a bed and subjected to the influence of a magnetic field. Ivanov et al, *Comptes rendus de l'Academie bulgare des Science*, Tome 23, No. 7, 787–790 (1970) discloses a fluidization process using a ferrochrome catalyst for the conversion of carbon oxide with water vapor in a magnetic field. U.S. Pat. No. 4,115,927, supra, discloses the use of a ferromagnetic nickel containing catalyst, supplied commercially by Chemetron Corporation known as Girdler G87RS in a magnetically stabilized fluidized bed. The catalyst is 40 wt. % nickel on an alumina support, prereduced and stabilized by the manufacturer. Known catalysts of magnetic character are thus characterized as systems wherein irregular shaped ferromagnetic particles, effectively approximating spherical shape, are dispersed in admixture with nonferromagnetic particles, or catalyst composites comprised of ferromagnetic particles effectively of approximately spherical shape incorporated as inclusions within non-ferromagnetic materials which act as matrices for the ferromagnetic inclusions.

Whereas magnetically stabilized bed processes which utilize catalysts containing irregular shaped ferromagnetic inclusions, have proven useful in conducting various chemical reactions, notably hydrocarbon conversion reactions, their performance nonetheless falls far short of providing practical, economic commercial gas solid contacting processes. Simply stated, too much energy (and consequently too much cost) is required to maintain an effective magnetic field. Even in the use of a catalyst which contains a high concentration of particles, or inclusions of good ferromagnetic properties which ab initio may be sufficiently magnetic to meet borderline economics, the magnetic properties of the catalyst generally fade and grow poorer as the time of the operation is continued and extended. The problem is intensified due to shock, thermal excursions, or the like such that the bed of catalytic particles is gradually demagnetized as the time of operation of the process is extended.

The magnetization achieved when a ferromagnetic component is placed in an applied field depends on the nature of the ferromagnetic component, the effective field strength, and the magnetic history of the material. The principal variable available to control the extent of magnetization of a specific ferromagnetic material is the effective field strength. The effective magnetic field strength, $H_e$, applied across a bed is equal to the (empty vessel) applied magnetic field strength, $H_a$, diminished by a factor dM, which can be mathematically stated, as follows:

$$H_e = H_a - dM \tag{1}$$

where d is taken as a demagnetization coefficient $(0 < d < 1)$ related to geometry, and M is the magnetization of the bed. It is thus highly desirable to achieve a high value of $H_e$ and consequent high value of M, while using as low of an applied field $H_a$ and consequent energy expenditure as possible. Thus, it is desirable to employ a bed geometry with as low a value of d as possible.

In the light of the known art then a pertinent consideration for the efficient operation of a magnetically stabilized bed was the over-all bed, particularly the shape or geometry of the bed itself as opposed to a consideration of the particles themselves. Thus, the bed per se constituted a macro-particle, and its shape was the pertinent factor for consideration in the development of a more efficient process, not the shape or geometry of the particles per se which were mere constituents of the macro-particle, or bed. In accordance with this concept the demagnetization coefficient d was related to be geometry, and the magnetization M was the volume average of magnetization of the bed. This then led to the conclusion that bed geometries having long dimensions in the direction of the field and short dimensions perpendicular to it would have low values of d, which was desirable. Or, conversely stated, it was concluded that bed geometries having long dimensions perpendicular to the field and short dimensions parallel to it would have large values of d, which was undesirable. A consideration of the value of M also leads to the conclusion that the magnetically stabilized fluidized bed, and associated magnetizing equipment, should have large dimensions in the direction of the field and small dimensions perpendicular to the field.

Composite magnetic catalysts, however, have proven far more difficult to magnetize then expected. Pure ferromagnetic components show roughly the expected behavior, saturating at the proper value and, when corrected to demagnetization, show high susceptibilities. Composites which are comprised of admixtures of ferromagnetic and nonferromagnetic components, or composites which contain ferromagnetic inclusions, also saturate at the proper values, but show low susceptibilities, even when corrected for demagnetization. Applied fields required to achieve a given magnetization have proven to be of magnitude considerably higher than predicted, and quite unfeasible for commercial operations.

The difficulty with the prior art theory therefore is that it failed to consider, much less provide an understanding or appreciation of the significance of the geometry of the particle itself. Whereas prior art theory would lead to a desire for a bed with a low value of d, it nevertheless failed to permit such an achievement. The sum-total of the various particles used in the formation of the magnetically stabilized fluidized beds of the prior art provided values for $d_f$, a demagnetization coefficient based on inclusion shape, as hereinafter discussed, of about ⅓. Such values for $d_f$, as suggested, however, do not permit commercially feasible operations in fluid-solids contacting processes.

It is, accordingly, the primary objective of the present invention to obviate the foregoing and other disadvantages of processes which utilize magnetically stabilized fluidized beds for fluid-solids contacting, inclusive particularly of adsorption, absorption, particulate removal and catalytic processes.

A particular object is to provide a magnetically stabilized fluidized bed process across which an external magnetic field can be more effectively applied, i.e., to achieve higher magnetization at a given applied field and ferromagnetic component; or the same applied field with a component possessing less ferromagnetism or a less magnetically susceptible component; or combination of such effects.

A further object is to provide a magnetically stabilized fluidized bed process which utilizes a bed of ferromagnetic solids particles constituted of one or more ferromagnetic inclusions dispersed within a nonferromagnetic matrix material across which a field can be applied in a manner which provides lower demagnetization coefficients.

A more specific object is to provide composites of particulate material wherein magnetically soft ferromagnetic inclusions are dispersed in a matrix of nonferromagnetic material, inclusive particularly of composites of such character which also contain a catalytically active component, or components, these composites being particularly useful in magnetically stabilized fluidized beds for conducting gas-solids contacting, or for conducting catalytic reactions, or both.

These and other objects are achieved in accordance with the present invention which, in general, embodies:

(A) a composition, or article of manufacture, characterized as a particulate material which can be oriented within, and formed into a magnetically stabilized fluidized bed to provide an effective demagnetization coefficient significantly less than ⅓, suitably a demagnetization coefficient, $d_f$, ranging from about 0.0027 to about 0.174, preferably from about 0.022 to about 0.108, which comprises:

(i) particles of average size ranging from about 10 micrometers (μm) to about 4000 μm, preferably from about 50 μm to about 500 μm, each containing a nonferromagnetic component, or components, and preferably a catalytically active component, or components, composited with a single elongated ferromagnetic component, the ferromagnetic component being multidomain, having dimensions of at least 1 μm in all directions and a length:diameter (L/D) ratio of at least 2 but not more than 17.3, said ferromagnetic component being present in the composite particles as an inclusion within a nonferromagnetic matrix, a ferromagnetic inclusion being sufficiently spaced apart in the particulate composite that essentially any ferromagnetic inclusion can be circumscribed in an imaginary sphere which does not include or intersect any other ferromagnetic inclusion of said particulate composite, said ferromagnetic inclusion constituting at least 0.5%, preferably at least 5%, but not more than $3/2(L/D)^2$ of the total volume of each particle, where the L/D ratio is the ratio of the longest dimension of the ferromagnetic inclusion relative to the shortest dimension, and the particles can, in said magnetically stabilized fluidized bed rotate, or turn to line up the long dimensions of the ferromagnetic components parallel to the direction of the field and a short dimension perpendicular to the direction of the field; or (ii) particles of average size ranging from about 10 micrometers (μm) to about 4000 μm, preferably from about 50 μm to about 500 μm, each containing a nonferromagnetic component, or components, and preferably a catalytically active component, or components, and within each of which is composited a plurality of elongated ferromagnetic components, a ferromagnetic component being multidomain, having dimensions of at least 1 μm in all directions, elongated in one or two dimensions, and having a length:diameter (L/D) ratio of at least 2 but not more than 313, preferably not more than 30, said ferromagnetic components being present in the composite particles as inclusions within a nonferromagnetic matrix, arranged in such a way that essentially any ferromagnetic inclusion can be circumscribed in an imaginary sphere which does not include or intersect any other ferromagnetic inclusion, and oriented in such a way that there is a preferred direction in each particle such that all the ferromagnetic inclusions in that particle have a long dimension essentially parallel with said preferred direction and constituting at least 0.5%, preferably at least 5%, but for particles elongated in one dimension not more than $2\pi/3(L/D+1)^2$, and for particles elongated in two dimensions not more than $\pi/2(L/D+1)$, of the total volume of each particle, where L/D is the average ratio of the longest dimension of a ferromagnetic inclusion relative to its shortest dimension, and, in said magnetically stabilized fluidized bed, the particles can rotate, or turn to line up said preferred direction parallel to the direction of the field such that essentially all of the ferromagnetic inclusions have a long dimension essentially parallel to the direction of the field; and (B) A process wherein the plurality of composite particles as characterized in (A)(i) and (A)(ii), supra, is formed into a magnetically stabilized fluidized bed, and oriented in said magnetic field to provide a demagnetization coefficient, $d_f$, significantly less than $\frac{1}{3}$, suitably a demagnetization coefficient ranging from about 0.0027 to about 0.174, preferably from about 0.022 to about 0.108.

It has been found that the shape of the individual ferromagnetic inclusions of a composite structure is far more important than the shape of the bed in the operation of magnetically stabilized fluidized bed processes. The ferromagnetic inclusions of a composite particle are sufficiently spaced apart from other ferromagnetic inclusions that they, when formed into a bed and subjected to a magnetic field with the axes of the ferromagnetic inclusions aligned parallel to the field, will provide far higher magnetization in a given applied field than particles otherwise identical and similarly dispersed except that the elongate ferromagnetic inclusions are spherical or of irregular shape as disclosed in prior art processes.

The ferromagnetic inclusions, as practiced in accordance with this invention are of essentially any shape, regular or irregular wherein at least one dimension is considerably longer than another. Particles containing such inclusions can be oriented within the field to provide a demagnetization coefficient $d_f$, considerably less than $\frac{1}{3}$. Shapes wherein the ferromagnetic inclusions are spherical, or such shapes which are effectively spheroid cannot be used. Nonoriented ferromagnetic inclusions, not truly spherical in the geometrical sense, may yet contain deviations from sphericity which are randomly directed and cancel each other so that they are, in effect spherical; and the sphere, with equal dimensions in all directions, has a demagnetization coefficient $d_f$ equal to one-third which is unusable. The ferromagnetic inclusions are preferably of cylindrical shape, oblate spheroids, or extremely prolate spheroids. The ferromagnetic inclusions, used in the magnetically stable fluidized beds, thus necessarily have effective L/D ratios considerably greater than unity, and provide demagnetization coefficients $d_f$ significantly less than $\frac{1}{3}$. The preferred shapes are thus those having considerably high L/D ratios, suitably L/D ratios ranging at least 2:1, preferably L/D ratios ranging from about 3:1 to about 313:1.

Specifically, (1) for a plurality of particles, each containing a single elongated ferromagnetic inclusion the L/D ratio ranges to about 17.3:1, preferably 5.5:1; (2) for a plurality of particles, each containing a plurality of ferromagnetic inclusions elongated in one dimension the L/D ratio ranges to about 19.5:1, preferably 5.5:1; and (3) for a plurality of particles, each containing a plurality of ferromagnetic inclusions elongated in two dimensions the L/D ratio ranges to about 313:1, preferably 30:1. Particles having an L/D ratio of at least 2:1 provide a demagnetization coefficient, $d_f$, of about 0.174, or less; particles having L/D ratios within the ranges 3:1 to 100:1 provide demagnetization constants ranging about 0.108, or less; and those having L/D ratios within the ranges 4:1 to 20:1 provide demagnetization constants ranging 0.075, or less. The preferred composite particle is of roughly spherical shape and has an average diameter ranging from about 10 $\mu$m to about 4000 $\mu$m, preferably from about 40 $\mu$m to about 500 $\mu$m.

It is essential to use the externally applied field effectively to achieve high effective magnetization with any given ferromagnetic component. Or, stated alternatively, it is necessary in terms of commercial reality that a ferromagnetic component exhibit high induced magnetism in a small applied field. Conventional wisdom, however, would lead to the belief that the individual ferromagnetic inclusions would interact so much with each other that, in a magnetically stabilized fluidized bed, the over-all effect would be that of a large bar magnet. For example, in considering the action of a magnetic field on a bar magnet it is found that a soft ferromagnetic material can be magnetized when a magnetic field $\vec{H}$ is applied, and that a magnetic moment $\vec{m}$ is induced in the sample, which is related to the magnetization $\vec{M}$ by $\vec{M}=4\pi(\vec{m}/V)$. This moment is due to current loops from unpaired electrons, but an equivalent and often useful viewpoint is that it is due to the separation of pairs of magnetic poles. The usefulness of this viewpoint lies in the fact that $4\pi$ lines of the $\vec{H}$ field terminate on each magnetic pole. However, it is the strength of $\vec{H}$ inside the ferromagnet which determine the magnetic moment, and all ferromagnets of similar material, which have the same magnetic moment [(number of poles)×(separation)], must have the same field strength $\vec{H}$ inside. For example, a bar magnet four units in length and one unit in width may contain two north poles and two south poles four units in length apart, and another of similar size may contain eight north poles and eight south poles one unit apart. Thus, although both have the same moment, the latter would be capable of cancelling $32\pi$ lines of $\vec{H}$ with its poles, and hence far more applied field is required to magnetize it than the other, which can cancel only $8\pi$ lines. One would thus expect a bed with the long dimension aligned with a field, or horizontally aligned bed to be superior to a bed having its long side vertically aligned with the field.

The amount of field lost, it would also be expected, would depend on the geometry of the bed through the demagnetization coefficient d, in accordance with model $H_e=H_a-dM$, supra. It has been found, however, that this model approximates objective reality for particle compositions which contain ferromagnetic inclusions with nonferromagnetic components, only when the ferromagnetic inclusions are present in high concentrations. The model is not valid for beds which contain the ferromagnetic inclusions in dilute concentration as required for catalysts for use in magnetically stabilized fluidized bed operations. Applicant, however, after considerable experimentation, study and rejection of this and various other models has discovered that the geometry for mathematical equation (1), supra, is that of the individual ferromagnetic inclusion, and its magnetization, not the magnetization of the entire bed.

Applicant feels no necessity, and therefore no desire of being bound by any specific theory of mechanism, but is nonetheless quite confident that he has formulated a model which adequately explains the true phenomena which are occurring in a fluidized bed of ferromagnetic solids operated under the influence of a magnetic field. In accordance with this model every individual ferromagnetic inclusion actually "sees," or experiences, the same external field, as opposed to the gross bed concept. Accordingly, a model which conforms to objective reality must include a term $d_f M_f$, wherein the terms d and M are as previously identified, and the subscript f is an average value of a ferromagnetic inclusion, rather than an average value taken over the entire bed. The magnetic field experienced by an inclusion has been found to conform substantially to that within a Lorentz polarization sphere.

Dielectric materials placed in an electric field, in accordance with the new model developed by Lorenz formulation, form induced electric poles, which cancel part of the applied electric field, exactly as magnetic poles cancel applied magnetic field. The amount of field cancelled is related to sample geometry and polarization, P, by exactly the same demagnetization (depolarization) coefficient, $$E_{internal} = E_{external} - d(4\pi P) \quad (2)$$

except that the $4\pi$ factor is included in the definition of M and not of P.

The Lorentz polarization sphere, which relates to a consideration of the dieletric properties of a substance, formulates quite imaginatively the local field applied to a small spherical cavity cut out of a specimen around a reference point. It constitutes a measurement of the total electric field applied at the reference point and takes into account the field applied from external sources, the field of the polarization charges on the surface of the specimen, the depolarization field which results from polarization charges on the outer surface of the spherical cavity, and the field of the atoms within the cavity which constitutes the total effect at one molecule of the dipole moments of all of the other molecules in the specimen.

A well-known problem in classical electricity relates the polarization of a dielectric to the polarizability of an individual molecule and the local electric field at that molecule. An imaginary spherical cavity is described, centered on the molecule of interest. Other molecule dipoles outside the cavity are treated on an average basis, according to their contribution to the surface charges on the imaginary cavity. The depolarization field due to these charges was first calculated by Lorentz and equals $-\frac{1}{3}(4\pi P)$. Contributions to the electric field at the molecule by dipoles inside the cavity are summed on an individual basis. This leads to a depolarization effect $d(4\pi P)$ by the surface of the specimen, $-\frac{1}{3}(4\pi P)$ by the surface of the cavity, and the electric field $E_3$ by all the dipoles inside the cavity, $$E_{local} = E_{external} - d(4\pi P) + \frac{1}{3}(4\pi P) - E_3 \quad (3)$$

An exactly analogous treatment can be used for demagnetization in an magnetic stabilized fluidized bed wherein all of the ferromagnetic inclusions in a magnetic stabilized fluidized bed are considered as a Lorentz sphere which encloses exactly one inclusion. The magnetic field inside the particle is calculated in a manner analogous to that employed in calculating a local electric field. Outside the sphere, far enough from the particle to be averaged, the average magnetization of the bed is $M_b$. Inside the sphere, on a microscopic basis, the magnetization is zero everywhere except inside the inclusion, where it is $M_f$. The only difference from the electrostatic case is that the particles are far enough apart that inside the cavity the only demagnetization effect is that due to the particle of interest, $d_f M_f$. So the magnetic analogy to equation (3) is $$H_e = H_a - d_b M_b + \tfrac{1}{3} M_b - d_f M_f \quad (4)$$

This procedure provides a correct value of $H_e$ which is related to $M_f$ only by the intrinsic magnetic properties of the ferromagnetic component. In previously known magnetically stabilized beds the term $d_f M_f$ has been much larger and more significant than $d_b M_b$ or $\tfrac{1}{3} M_b$.

The applied field $H_a$ and magnetic moment m can be directly, experimentally determined, so that $d_b$ and $M_b$ can be calculated by further determination of sample volume and shape. Thus, the first three terms on the right side of equation (4) can be readily experimentally evaluated. The term $M_f$ is found to depend on the volume percent of the ferromagnetic component, and $d_f$ on inclusion shape and degree of orientation. The relationship between $H_e$ and $M_f$ is found to depend critically on inclusion purity and heat treatment. Rearranging equation (4) to put all unknown quantities on the left, $$H_e + d_f M_f = H_s = H_a - (d_b - \tfrac{1}{3}) M_b \quad (5)$$

where it can be explicitly recognized that each side of the equation is a measure of $H_s$, the cavity magnetic field which, though it produces a magnetic field strength inside the Lorentz sphere, it is nonetheless outside the particle of interest.

The usefulness of equation (5) in the new model is in relating $M_p$, the magnetization of a particle, averaged over the particle, including the ferromagnetic component, support, active catalytic component, or components, and pore volume but not the interstitial void volume of the bed. Calculating $M_p$ from m and $H_a$ involves corrections for voidage and sample geometry, which can be measured. $M_p$ is related to $M_f$ and $H_e$ through volume percent, inclusion shape and orientation, and inclusion intrinsic magnetization parameters. Therefore, just as the relationship between $H_e$ and $M_f$ for a given sample is invariant, so the relationship between $H_s$ and $M_p$ for a given sample is invariant. It is the right equality in equation (5), not equation (1), that predicts how $M_p$ responds to changes in sample shape and voidage.

To summarize, $H_a$ and m can be measured, and using known auxiliary constants, $H_s$ and $M_p$ can be calculated, to wit:

$$M_p = 4\pi \rho_p m / W, \quad (6)$$

$$H_s = H_a - (d_b - \tfrac{1}{3})(1 - \epsilon_o) M_p \quad (7)$$

where $\rho$ is the density, m is the magnetic moment, W is the mass and $\epsilon_o$ is the void fraction. Enough pairs ($H_s$, $M_p$) can be measured to determine the functional relationship between $H_s$ and M with acceptable accuracy. Then in the magnetic stabilized bed, with new, known values of $H_s$, $d_b$, and $\epsilon_o$, that relationship can be solved simultaneously with equation (7) to give the unknown values, $H_s$ and $M_p$.

Every inclusion thus "sees" the same external field $H_s$, as given in equation (7), and each of the terms $H_e$ and $M_f$ is a function of the $d_f$ of the inclusion. Every inclusion has a different $d_f$, and $H_e$ and $M_f$ can be increased within an applied field of given field strength by the production of particles having a low $d_f$. Such particles have a long dimension parallel to the field.

The present process, and compositions, are useful in various processes inclusive particularly of adsorption, absorption, particulate removal and catalytic processes. The compositions are particularly useful as filters for the removal of contaminant particles from a gas stream, whether or not the particles additionally function as catalysts. The process, and compositions, are also particularly useful in conducting hydrocarbon conversion reactions illustrative of which are fluid hydroforming (reforming), catalytic cracking, isomerization, coking, polymerization, hydrofining, alkylation, partial oxidation, halogenation, dehydrogenation, desulfurization, reductions, gasification of coal, fluid bed combustion of coal, coal liquefaction, retorting of oil shale and the like.

In the preparation of particulate solids, or catalysts for use in the practice of this invention it is essential that the elongate ferromagnetic particles present in an aggregate of the particles, or as inclusions within a composite, be spaced apart one from another, separated, or present in dilute concentration so that each experiences the applied field.

Specifically, essentially each ferromagnetic inclusion should be sufficiently separated from all others that an imaginary sphere, the Lorentz sphere, can be circumscribed around it, which neither includes not intersects any other ferromagnetic inclusion, around said ferromagnetic inclusion. Simple geometrical considerations show that this condition imposes an upper limit to the volume fraction of the ferromagnetic inclusions in each composite particle, depending on the specific embodiment of the invention, as follows: (1) for a plurality of particles, each containing a single elongated ferromagnetic inclusion, approximating the shape of the inclusion as a cylindrical needle of length L and diameter D, the upper limit is $3/2(L/D)^2$; (2) for a plurality of particles, each containing a plurality of ferromagnetic inclusions elongated in one dimension, approximating the shape of the inclusions as cylindrical needles of average length L and diameter D, the upper limit is $2\pi/3(L/D+1)^2$; and (3) for a plurality of particles, each containing a plurality of ferromagnetic inclusions elongated in two dimensions, approximating the shape of the inclusions as cylindrical discs of diameter L and thickness D, the upper limit is $\pi/2(L/D+1)$. The further requirement that the elongation L/D shall be at least 2 necessarily sets absolute upper limits on the volume fraction of the ferromagnetic inclusions as follows: (1) 37.5%; (2) 23.3%; and (3) 52.4%, respectively, supra. Likewise, the requirement that the ferromagnetic inclusions constitute at least 0.5%, and preferably 5%, of the volume of the particles sets upper limits on the elongation of the ferromagnetic inclusions as follows: for (1), supra, L/D cannot exceed 17.3, preferably 5.5; for (2), supra, L/D cannot exceed 19.5, preferably 5.5; and for (3), supra, L/D cannot exceed 313, preferably 30, respectively.

The ferromagnetic inclusions are thus particles elongated along one axis to provide needle-like shapes, or along two axes to provide flat plates, these permitting the use of composites which require low practical fields for conducting commercial magnetically stabilized fluidized bed operations. A needle-like shape, or ferromagnetic particle elongated in one direction for purposes of this invention is defined as a particle having one long axis relative to its other axes, extension in space being generally defined, mathematically, by a set of three intersecting lines extending through the axes of said particle from on boundary to another, each at right angles to the other two. One axis, the major axis, of a needle-like particle is quite long, and the minor axes in contrast are quite short and equal, or substantially equal, in length. Such shape is thus illustrated by an extrudate particle which is of cylindrical shape, having one long axis, a major axis, and two relatively short axes of equal length. In geometric imagery or description, such shapes are those whose surface intercept with the plane defined by the short axes is essentially a circle, square or other equal sided figure but with the planes defined by the long axis and either of the short axes can approximately be described as an elongated elipse. On the other hand, particles of this invention can be elongated in two directions; such particles having two relatively long axes and one short axis. The two long axes of the particle can be of equal or unequal length, but both are always longer than the third axis which is of shorter length than the other two axes of the particle. Particles wherein the two long axes are equal, or substantially equal are illustrated by oblate spheroids. Particles wherein the two long axes are unequal are illustrated by prolate disc shaped particles. Again in geometric imagery, the particle surface intercepts form circles or nearly circular elipses or other equal or nearly equal sided figures with the plane defined by the two long axes but forms planar figures which can be approximated by elongated elipses with the planes defined by either long axis with the short axis.

It is essential in the formation of particulate solids, or catalysts that the elongate ferromagnetic inclusion, or inclusions, be dispersed within the nonferromagnetic material such that it serves as a matrix, or continuous phase surrounding said inclusion, or inclusions. In the formation of catalysts, it is also essential that the catalytic component, or components, be well dispersed upon the surface of the particles in catalytic amounts. The catalytic component, or components, is dispersed to a high surface area state upon the surface of the particles; the particles serving the same function as conventional catalyst supports. In a catalytically effective state of dispersion, a catalytically active concentration of the catalytic component, or components, is present on the surface of the particles in essentially atomically dispersed form, as defined by the size of the crystals of the dispersed catalytic component, or components (length of a side of an assumed cubic crystallite).

The matrix portion of particles is preferably constituted of a refractory porous inorganic oxide. The matrix material constitutes a support with which the catalytic component, or components, is composited, in catalytically effective amount, suitably formed by cogellation with a catalytic metal component, or components, or by impregnation of the particles with a solution which contains a soluble compound, or compounds, of the metal, or metals. The matrix material can be constituted of, or contain, for example, one or more of alumina, bentonite, clay, diatomaceous earth, zeolite, silica, magnesia, zirconia, thoria, and the like. The most preferred matrix material is alumina to which, if desired, can be added a suitable amount of other refractory carrier materials such as silica, zirconia, magnesia, titania, etc., usually in a range of about 1 to 20 percent, based on the weight of the support. Exemplary of a matrix material for the practice of the present invention is one having a surface area of more than 50 m$^2$/g, preferably from about 100 to about 300 m$^2$/g, and higher, a bulk density of about 0.3 to 1.0 g/ml, and higher, an average pore volume of about 0.2 to 1.1 ml/g, and an average pore diameter ranging about 30 Å to about 300 Å, and higher.

Essentially any catalyst component, or components, can be composited with the particles dependent upon the type of reaction which is to be carried out. For example, in conducting hydrocarbon conversion reactions, e.g., a hydroforming (reforming, with hydrogen) reaction, a catalyst can be formed which comprises a composite of a refractory or inorganic oxide support material, particularly alumina, and a Group VIII noble metal hydrogenation-dehydrogenation component (Periodic Table of the Elements, Sargent-Welch Scientific Company, Copyritht 1968), e.g., ruthernium, rhodium, palladium, osmium, iridium or platinum, notably platinum, to which a promoter metal, e.g., rhenium, iridium or the like may be added to promote the activity and selectivity of the catalysts. Suitably, the reforming catalyst, or composite also contains an added halogen component to provide acidity, particularly fluorine or chlorine, and preferably the promoter component is introduced into the support, or catalyst, by impregnating same with a solution comprising a soluble salt or compound thereof.

In reforming operations, it is desirable that the sulfur concentration in the naphtha feed not exceed about 10 parts, and preferably should not exceed about 5 parts, per million parts of feed. At these concentrations, poisoning of the catalyst can usually be avoided provided that sufficient hydrogen is added or recycled to strip out the sulfur, as hydrogen sulfide, from the reaction mixture. By maintaining low sulfur in the feed and a sufficiently high recycle gas rate therefore, sulfur accumulation and consequent catalyst poisoning can be avoided.

The present compositions are also particularly suitable for conducting hydrofining reactions, which refers to the catalytic hydrogenation of solvents and distillate fuels. Hydrofining is employed to remove sulfur, nitrogen and other nonhydrocarbon components, as well as to improve the odor, color, stability, engine cleanliness and combustion characteristics, and other important quality characteristics. Sulfur-containing naphtha feedstocks as used in reforming are generally hydrofined without substantial hydrocarbon conversion in the presence of sulfur (and nitrogen) tolerant catalysts, e.g., a Group VI-B or VIII metal catalyst such as cobalt molybdenum on an alumina-silica base to substantially eliminate the sulfur. When applied for processing catalytic cracking feedstocks, hydrofining significantly reduces carbon yield, increases gasoline yield, and improves the quality of the catalytic cracking stocks.

The catalysts employed in hydrofining are comprised of composites of group VI-B or Group VIII metal hydrogenation (hydrogen transfer) components, or both, with an inorganic oxide base, or support, typically alumina. Typical catalysts are molybdena on alumina, cobalt molybdate on alumina, nickel molybdate or nickel tungstate on alumina. The specific catalyst used depends on the particular application. Cobalt molybdate catalysts, are often used when sulfur removal is the primary interest. The nickel catalysts find application in the treating of cracked stocks for olefin or aromatic saturation. Sweetening (removal of mercaptans) is a preferred application for molybdena catalysts.

The typical catalytic cracking process unit is one wherein a gas oil feed is cracked in a cracking zone at elevated temperature in the presence of a cracking catalyst, the catalyst is regenerated in a regeneration zone by burning coke off the catalyst, and the catalyst is circulated between the cracking zone and the regeneration zone. Suitable cracking catalysts for the practice of the present invention comprise oriented elongate ferromagnetic inclusions incorporated within such catalysts. Suitable cracking catalysts include conventional silica-base materials which, preferably, contain bulk porous alumina dispersed therein. Illustrative of such catalyst are, e.g., amorphous silica-alumina; silica-magnesia; silica-zirconia; conventional clay cracking catalysts, etc. The amorphous gel silica-metal oxide cracking catalyst may further be composited with kaolin in amounts of about 10 to 40 wt. % (based on total weight of the composited catalyst) and up to 20 wt. % or more crystalline alumino-silicate zeolite, such as faujasite.

Silica and alumina base catalysts, especially the latter, are particularly suitable for conduting a wide range of reactions. Silica based cracking catalyst including naturally occurring activated clays and synthetic prepared composites have long been recognized as paths useful in promoting catalytic hydrocarbon reactions. Siliceous catalysts contain silica and frequently one or more promoting metal compounds such as one or more oxides or sulfides of a Group VI-B metal (e.g., molybdenum or tungsten) either along or in admixture with a Group VIII metal compound, specifically an oxide or sulfide of nickel or cobalt. Active catalysts are also obtained by depositing such Group VI-B and/or a Group VIII metal compound on an inorganic oxide, preferably an alumina support or a support comprising a combination of silica and alumina. Likewise other promoting oxides such as zirconia and magnesia may be employed in conjunction with a support containing silica and/or alumina.

The catalysts of this invention may be the form of powder, beads, tablets, pills or pellets or extrudates depending upon the type of process. Composites with highly elongated ferromagnetic inclusions, permit the use of low practical fields for commercial magnetically stabilized fluidized bed reactions. The use of ferromagnetic inclusions, elongated along one axis to provide needle-like shapes, or along two axes to provide flat plate-like shapes provide the desired improvements. Various ferromagnetic substances, including but not limited to magnetite $Fe_3O_4$, $\gamma$-iron oxide ($Fe_2O_3$), ferrites of the form $XO.Fe_2O_3$, wherein X is a metal or mixture of metals such as Zn, Mn, Cu, etc.; ferromagnetic elements including iron, nickel, cobalt and gadolinium, alloys of ferromagnetic elements, etc. if of elongate shape may be used as ferromagnetic inclusions. Nonmagnetic materials can be coated with or dispersed within solids having the quality of ferromagnetism to provide the ferromagnetic inclusions. Generally, a ferromagnetic composite is incorporated with a nonmagnetic catalytic material, and the fluidized bed containing such composites can also include particulate solids which are nonmagnetizable. The longest side of the ferromagnetic particles or inclusions can range to 4000 micrometers ($\mu$m), and higher, but generally range from about 2 to about 1000 $\mu$m, preferably from about 50 $\mu$m to about 500 $\mu$m. The smaller diameter of the particles generally ranges from about 0.5 to about 500 $\mu$m, preferably from about 1 to about 100 $\mu$m. In order for each ferromagnetic inclusion to behave as a typical ferromagnet, independently expericiencing the magnetic field, it is necessary that each inclusion contain multiple magnetic domains. This requirement is generally met if all dimensions of the inclusion exceed 1 $\mu$m. Smaller ferromagnetic particles, containing only one magnetic domain, behave as permanent, hard, magnets even if they are composed of magnetically soft material, and do not respond smoothly or reproducibly to the applied field. A preferred technique for providing the elongated or oriented ferromagnetic particles for use as inclusions is by physical shaping methods, e.g., by the ball milling of a ferromagnetic metallic powder, e.g., iron, iron alloys such as steel, cobalt, alloys of cobalt, nickel, alloys of nickel and the like.

Particles, each of which contains a single elongated ferromagnetic inclusion, can be prepared by fluidizing a suitable elongated ferromagnetic powder in a conventional fluidized bed, using any sufficiently nonreactive gas, such as air, nitrogen, carbon dioxide, etc., for fluidization. The upper portion of the bed can be heated to maintain the top bed temperature in the range of about 140° F. to about 390° F., while a nozzle, or nozzles, near the bottom of the bed spray a fine mist of alumina sol into the fluidized mass of particles along with the fluidizing gas. The mist deposits on the individual ferromagnetic particles, and as they move to the top of the bed the sol is dried to form an alumina precursor, such as boehmite, AlO(OH). The particles move back to the bottom of the bed where they are coated with more alumina sol, and this process is continued until the desired amount of alumina precursor has been deposited; the surface tension in the alumina sol causing the finished particles to have a substantially spherical shape. The normal tubulence on a conventional fluidized bed is maintained sufficient to transport the particles back and forth between the top and bottom of the bed, and the sol addition rate is maintained low enough, and sufficient to keep particles from agglomerating. Radio frequency induction heating can provide a convenient way to heat the top of the bed while eliminating any tendency of the particles to stick to heat-transfer surfaces. When the desired amount of alumina precursor has been deposited, the particles are finished by calcining to convert the precursor to alumina, either in a separate vessel, or simply by increasing the power to the radio frequency in the induction coils.

Alternatively, a suitable ferromagnetic material can be mixed with an aqueous solution of aluminium hydroxychloride and hexamethylene tetramine, in concentrations such that the finished alumina particles will contain on the one hand, an average substantially less than one ferromagnetic inclusion per particle. Droplets of the mixture are added to the top of a hot oil column kept at about 190° F., surface tension causing the droplets to take a spherical form, but particle elongation can be produced by increasing the applied field. The heat causes the alumina solution to gel before the elongated droplets reach the bottom of the column. Magnetic separation is used to separate those particles which do contain one ferromagnetic inclusion from those which do not. The selected, desired particles are further cured and calcined, while those which are not are repeptized with dilute hydrochloric acid and recycled as starting material. This second preparation method is more suitable for particles containing a relatively low volume fraction of ferromagnetic inclusion, while the first preparation is more suitable for preparing particles which contain a relatively high volume fraction of ferromagnetic inclusion. On the other hand, of course, particles can be made which contain a plurality of ferromagnetic inclusions by increasing the concentration of ferromagnetic inclusions in the droplets added to the top of the hot oil column. A magnetic field can be applied across the column to cause parallel orientation of the ferromagnetic particles which, as the particles congeal, become parallelly oriented inclusions within an aluminum matrix.

The invention will be more fully understood by reference to the following selected nonlimiting examples and comparative data which illustrate its more salient features. All parts are given in terms of weight units except as otherwise specified.

The following Examples 1 and 2 are reference demonstrations based on the parior art. Example 1 shows that for randomly oriented materials the particle magnetization is a function of the concentration of the magnetic component as long as the concentration is not too high. The maximum concentration examined was 78 wt. %. Example 2 shows that at 92.3 wt. % concentration of stainless steel on alumina, particle to particle interactions start to occur that lower the magnetic moment of the particles.

EXAMPLE 1

Magnetic composite materials were prepared from atomized 410 stainless steel powder in a range of concentrations, matrices, and particle sizes. Preparative techniques included: (1) mixing the 410 stainless steel powder with a silica-alumina gel or an alumina gel and spray-drying the mixture to form a composite powder, (2) spray-drying as in (1) and then calcining the resulting powder; (3) mixing the 410 stainless steel powder with alumina powder or polypropylene powder and pressing a pellet of the mixture in a hydraulic press; and (4) mixing the stainless steel powder with silica-alumina gel and allowing the entire mixture to harden in a tray, then crushing the resulting block to form a composite powder. Concentration of stainless steel in the finished composites varied from 0.4 wt. % to 78 wt. %, and from 0.09 Vol. % to 39 Vol. %. In all cases, the volume percent stainless steel in the composite was substantially less than the volume percent stainless steel in the pure stainless steel powder (47%), so that there was substantially no direct contact of stainless steel particles within any of these composites. A very fine mesh cut of the atomized stainless steel, with particle sizes from 0 to 30 $\mu$m, was used in some preparations. A coarser cut, with particle sizes from 20 to 44 $\mu$m, was used in the other preparations. A total of 20 different composites were prepared.

The magnetic properties of all these samples were measured using a Princeton Applied Research Model 155 Vibrating Sample Magnetometer and a conventional laboratory electromagnet. Sample shape was varied as much as the magnetometer sample holder would permit; all samples were approximately cylindrical, with their cylinder axis perpendicular to the applied field in the magnetometer. Sample diameters could only be varied from 0.32 to 0.38 cm, but sample lengths were varied from 0.25 to 0.97 cm.

It was found that stainless steel content was the only one of these variables that had a major influence on the magnetic properties of the composite. Magnetic moment at saturation was directly proportional to stainless steel content, with a proportionality constant of 171.5 emu/g stainless steel. In addition, the magnetic moment resulting when a given field was applied to an initially demagnetized sample was found to be principally determined by the stainless steel content. In particular, when an applied field of 200 oersteds was applied to each of the twenty initially demagnetized samples, the induced magnetic moment averaged 12.4 emu per gram of stainless steel in the sample, with a standard deviation of only ±1.5 emu/g.

EXAMPLE 2

A composite sample was prepared by mixing 410 stainless steel powder with alumina and pressing a pellet in a hydraulic press, just as in Example 1, except that the sample contained 92.3 weight percent stainless steel. Under the pressure of the hydraulic press, the sample was compressed to the extent that it contained 56.6 volume, percent stainless steel, somewhat greater than the original loose stainless steel powder. There was, therefore, extensive particle to particle contact between the stainless steel particles in this composite. The 0-30 μm mesh cut of 410 stainless steel powder was used in this composite, the sample diameter was 0.322 cm, and the sample length was 0.374 cm.

When this sample was demagnetized and a field of 200 oersteds was applied, the induced magnetic moment was only 8.9 emu per gram of stainless steel, significantly lower than the value of 12.4 emu/g from Example 1. This demonstrates that the magnetic interactions and magnetic behavior of magnetically dilute composites, where the magnetic particles are substantially separated from one another, are qualitatively different from the magnetic interactions and magnetic behavior of magnetically concentrated composites. Much, if not all, of the prior art teaching the advantages of orienting magnetic particles refers to highly concentrated magnetic materials. This invention, however, is specifically directed to magnetically dilute particulate composites, containing (1) for a plurality of particles, each containing a single elongated ferromagnetic inclusion less than 37.5 volume percent of the ferromagnetic component; (2) for a plurality of particles each containing a plurality of ferromagnetic inclusions elongated in one dimension less than 23.3 volume percent of the ferromagnetic components; and (3) for a plurality of particles, each containing a plurality of ferromagnetic inclusions elongated in two dimensions less than 52.4 volume percent of the ferromagnetic components.

The following Example 3 depicts the preparation and magnetic properties of nonoriented stainless steel ferromagnetic inclusions in an alumina bead.

EXAMPLE 3

A composite magnetic material in the form of beads was formed by mixing 0-30 μm 410 stainless steel powder with an aqueous solution of aluminum hydroxychloride and hexamethylenetetramine, and then adding droplets of the mixture to the top of a hot oil column kept at about 190° F. Surface tension caused the droplets to take a spherical form, and the heat caused the alumina solution to gel before the droplets reached the bottom of the oil column. The product, after further curing, was a 410 stainless steel/alumina composite in the form of spherical beads. The magnetic behavior of one of these beads was determined. It contained 39.4 wt. % (10.2 Vol. %) 410 stainless steel and had a diameter of 0.21 cm. Its magnetic properties were found to be isotropic and substantially the same as the magnetic properties of the composites mentioned in Example 1. In particular, after being demagnetized, its magnetic moment at 200 Oe applied field was 10.6 emu per gram stainless steel.

The following Example 4 contrasts a bead with oriented ferromagnetic inclusions with the bead of Example 3 containing random ferromagnetic inclusions.

EXAMPLE 4

A composite magnetic material in the form of beads was prepared, in substantially the same manner as described in Example 3, except that a permanent ring magnet was placed around the hot oil column near the top of the column. The presence of this magnet served to maintain an axial magnetic field through about the top 50 cm of the column, with a maximum field strength of about 300 oersteds. The magnetic field was intended to turn the 410 stainless steel particles and to orient them substantially parallel to the field, within their respective droplets, before the alumina in the droplets gelled. Once the alumina did gel, it was expected that the 410 stainless steel particles would be kept in this substantially parallel arrangement even after they were removed from the magnetic field.

Three beads which has been prepared in this manner were examined individually in a magnetometer. These beads were found to have highly anistropic magnetic properties, with one direction of easy magnetization and two mutually perpendicular directions of approximately equal hard magnetization. Their properties are summarized in the following table.

TABLE

|  | First Oriented Bead | Second Oriented Bead | Third Oriented Bead |
|---|---|---|---|
| Wt. % 410 Stainless Steel | 26.9 | 24.5 | 14.5 |
| Vol. % 410 Stainless Steel | 9.4 | 7.5 | 3.8 |
| Diameter, cm | 0.14 | 0.14 | 0.16 |
| Magnetic Moment at 200 Oe emu/g SS |  |  |  |
| Easy Direction | 26.2 | 26.0 | 30.7 |
| Hard Direction | 9.2 | 8.9 | 8.9 |
| Improvements over Example 1, Ratio | 2.1 | 2.1 | 2.5 |

It was also found that if these beads were placed in a magnetic field and were not restrained, they would spontaneously rotate until their direction of easy magnetization was substantially parallel to the direction of said applied field. In a magnetically stabilized fluidized bed, these beads would be free to turn in this manner. Therefore, in a magnetically stabilized fluidized bed at a given moderate applied field, beads prepared in this manner would have a magnetization 2 to 2.5 times as great as similar beads prepared according to Example 3 due to the alignment of the stainless steel particles.

The following Example 5 depicts the further improved magnetic properties of beads made with oriented elongated steel particles.

EXAMPLES 5

A portion of the elongated 410 stainless steel powder from ballmilling was incorporated into oriented composite beads according to the method described in Example 4, in which the bead formation is carried out in the presence of a substantial magnetic field. The same permanent magnet was employed to generate the magnetic field, and again it generated a maximum field strength of about 300 oersteds.

Two of the beads prepared in this manner were characterized in the magnetometer. As in Example 4, these beads were found to be highly anistropic. Their properties are summarized in the table below.

|  | First Oriented Bead with Ballmilled SS | Second Oriented Bead with Ballmilled SS |
| --- | --- | --- |
| Wt. % 410 Stainless Steel | 3.5 | 4.3 |
| Vol. % 410 Stainless Steel | 0.5 | 0.9 |
| Diameter, cm | 0.20 | 0.18 |
| Magnetic Moment at 200 Oe emu/g SS |  |  |
| Easy Direction | 51.0 | 41.2 |
| Hard Direction | 12.1 | 13.4 |
| Improvements over Example 1, Ratio | 4.1 | 3.3 |

This example demonstrates that magnetization in a magnetically stabilized fluidized bed can readily be increased by as much as a factor of at least three or four, by utilizing this invention.

It is apparent that various modifications and changes can be made in the conditions of operation, the identity of the ferromagnetic particle or inclusion used in forming the composite, the nature of the catalytic component, or components, and manner of incorporation; and the like without departing the spirit and scope of the invention.

Having described the invention, what is claimed is:

1. A process for conducting a reforming reaction via fluid-solids contacting wherein a particulate material which can be oriented within, and formed into a magnetically stabilized fluidized bed to provide an effective demagnetization coefficient of from about 0.0027 to about 0.174, which comprises contacting the fluid with a bed of particles comprising particles containing a non-ferromagnetic refractory, porous inorganic oxide component composited with a single elongated ferromagnetic component, the ferromagnetic component being multidomain, having dimensions of at least 1 $\mu$m in all directions and a length:diameter (L/D) ratio of at least 2 but not more than 17.3, said ferromagnetic component being present in the composite particles as inclusions within a nonferromagnetic matrix constituting at least 0.5%, but not more than $3/2(L/D)^2$ of the total volume of each particle, where the L/D ratio is the ratio of the longest dimesion of the ferromagnetic component relative to the shortest dimension, and the particles can, in said magnetically stabilized fluidized bed rotate, or turn to line up the long dimension of a ferromagnetic component parallel to the direction of the field and a short dimension perpendicular to the direction of the field, and wherein a catalytically effective amount of a metal selected from the group consisting of ruthenium, rhodium, palladium, osmium, iridium, and platinum, based on the weight of the catalyst composition, is dispersed on the surface of the composite particle, and the composite particle is catalytically active for conducting the reforming reaction.

2. The process of claim 1 wherein the volume of the ferromagnetic component in the composite constitutes at least 5 percent, but not more than 37.5 percent of the total volume of each particle.

3. The process of claim 1 wherein the length:diameter ratio of the ferromagnetic component ranges no higher than about 5.5.

4. The process of claim 1 wherein the demagnetization coefficient of a magnetically stabilized fluidized bed formed from the particles ranges from about 0.022 to about 0.108.

5. A process for conducting a reforming reaction via fluid-solids contacting wherein particulate material is oriented within, and formed into a magnetically stabilized fluidized bed to provide an effective demagnetization coefficient of from about 0.0027 to about 0.174, which comprises contacting a fluid with a bed of particles containing a non-magnetic refractory, porous inorganic oxide component composited with a plurality of elongate ferromagnetic components, a ferromagnetic component being multidomain, having dimensions of at least 1 $\mu$m in all directions, elongated in one or two directions, and having a length:diameter (L/D) ratio of at least 2 but not more than 19.5 where the ferromagnetic components are elongated in one direction, or an L/D ratio of not more than 313 where the ferromagnetic components are elongated in two directions, said ferromagnetic components being present in the composite particles as inclusions within a nonferromagnetic matrix, and oriented in such a way that there is a preferred direction in each particle such that all the ferromagnetic components in that particle have a long dimension essentially parallel with said preferred direction and constituting at least 0.5%, but for particles elongated in one direction not more than $2\pi/3(L/D+1)^2$, and for particulces elongated in two directions not more than $\pi/2(L/D+1)$, of the total volume of each particle, where L/D is the average ratio of the longest dimension of a ferromagnetic component relative to the shortest dimension, and, in said magnetically stabilized bed, the particles can rotate, or turn to line up said preferred direction parallel to the direction of the field such that essentially all of the ferromagnetic components have a long dimension essentially parallel to the direction of the field, and a catalytically effective amount of a metal selected from the group consisting of ruthenium, rhodium, palladium, osmium, iridium, and platinum, based on the weight of the catalyst composition, is dispersed on the surface of the composite particle, and the composite particles are catalytically active for conducting the reforming reaction.

6. The process of claim 5 wherein the volume of the ferromagnetic components elongated in one direction contained in the composite constitutes about 5 percent, but not more than 23.3 percent of the total volume of each particle, and the volume of the ferromagnetic components elongated in two directions contained in the composite constitutes at least 5%, but not more than 52.4 percent of the total volume of each particle.

7. The process of claim 5 wherein the length:diameter ratio of the ferromagnetic components contained in a particle ranges no higher than about 5.5 and 30, respectively.

8. The process of claim 5 wherein the demagnetization coefficient of a magnetically stabilized fluidized bed formed from the particles ranges from about 0.022 to about 0.108.

* * * * *